(12) United States Patent
Shatz et al.

(10) Patent No.: US 6,331,061 B1
(45) Date of Patent: Dec. 18, 2001

(54) IRRADIANCE REDISTRIBUTION GUIDE

(75) Inventors: Narkis E. I. Shatz, La Jolla; John C. Bortz, San Pedro, both of CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/264,998

(22) Filed: Mar. 9, 1999

Related U.S. Application Data

(62) Division of application No. 08/674,586, filed on Jul. 2, 1996, now Pat. No. 6,097,556.

(51) Int. Cl.$^7$ .................................................. G02B 5/08
(52) U.S. Cl. ........................ 359/857; 359/858; 359/859; 359/850
(58) Field of Search .................... 359/857, 858, 359/859, 850, 851, 852, 853; 385/131, 132, 133, 145

(56) References Cited

U.S. PATENT DOCUMENTS

| | | |
|---|---|---|
| 3,899,672 | * 8/1975 | Levi-Setti . |
| 3,923,381 | * 12/1975 | Winston . |
| 4,270,840 | * 6/1981 | Cobble . |
| 5,016,995 | * 5/1991 | Pullen . |
| 5,237,170 | * 8/1993 | Shatz . |

FOREIGN PATENT DOCUMENTS

DD-0232561-A * 1/1996 (DE) .
WO-9007800 * 7/1990 (WO) .

OTHER PUBLICATIONS

W.T. Welford & R. Winston; High Collection Nonimaging Optics; Dated 1989; pp. 47–88, 105–111,171–187.*

* cited by examiner

*Primary Examiner*—Mohammad Sikder
(74) *Attorney, Agent, or Firm*—Sidley Austin Brown & Wood

(57) ABSTRACT

An irradiance redistribution guide (IRG) for providing from a radiation source having a nonuniform irradiation distribution, a predetermined irradiance distribution over a predetermined target area spaced away from the IRG. The IRG includes a tubular reflective inner surface disposed between an entrance aperture and an exit aperture. The reflective inner surface has a varying cross-sectional radius. The profile of the cross-sectional radius is defined by a spline function that is uniquely determined by a plurality of knots. The IRG, when used in conjunction with a high-power solar concentrator, is advantageous in materials processing that requires high irradiance level that is uniformly distributed over an area spaced away from the exit aperture by a working distance.

10 Claims, 10 Drawing Sheets

— y=−0.5cm

— y = −1.25cm

IRRADIANCE REDISTRIBUTION GUIDE

RELATED APPLICATION

This is a division of application Ser. No. 08/674,586, now U.S. Pat. No. 6,097,556 filed Jul. 2, 1996.

BACKGROUND OF THE INVENTION

This invention relates generally to optical devices for altering the distribution of radiant energy and, more particularly, to optical devices for altering the spatial and/or angular distribution of electromagnetic radiation between an input plane and an output plane.

An energy concentrator is an optical device for increasing, between an input plane and an output plane, the energy density of radiant energy. One instance of a concentrator is a mirror or lens that focuses incident radiation to a relatively small area in the concentrator's focal or target plane. The resulting irradiance distribution often has a peaked shape. An energy concentrator generally is designed to maximize the amount of incident radiation that is directed onto a target area. By way of example, the irradiance distribution in the focal plane of a 10 kilowatt solar concentrator is shown in FIGS. 15A and 15B. The peaked distribution limits the possible applications of the concentrated irradiance.

In some applications, a uniform irradiance distribution over a specified target region is desired while simultaneously maintaining as high a mean irradiance level as possible. It has been found that defocusing the concentrator, by placing the target area of interest in front of or behind the focal plane, fails to provide a uniform irradiance distribution, as shown in FIGS. 16A and 16B. It will be observed that, although the irradiance distribution in the focal plane exhibits a well formed peaked distribution, the unfocused beam exhibits wide intensity differences across the target area. If the target area is an absorber of the concentrated energy, it must be able to withstand extreme thermal stresses in the various highly localized regions associated with the intensity peaks in the defocused irradiance distribution. At high irradiance levels, some absorbers of interest cannot withstand these high thermal stresses. Also, it is typically inefficient to configure an absorber to accommodate these stresses.

Theoretically, a long tube having a highly reflective inner surface, when a nonuniform irradiance distribution is input at one end, can output a uniform irradiance distribution at the other end. However, the use of such a tube is largely impractical because of the long length required and because of large reflective losses due to the multiple reflections occurring in the tube.

Accordingly, there is a need for a relatively compact device having a reflective surface that distributes, in a predetermined manner, the irradiance from a radiation source over a predetermined target area. The present invention satisfies this need.

SUMMARY OF THE INVENTION

The present invention provides a relatively compact reentrant optical guide that redistributes electromagnetic radiation to achieve a desired irradiance distribution. One embodiment of the invention is a method of altering the spatial and/or angular distribution of electromagnetic radiation. An optic is configured to have an input region, an output region, and a reflective surface. At least some electromagnetic energy incident at the optic's input region is output to the optic's output region. A portion of the output electromagnetic radiation has no interaction with the reflective surface. At the optic's output region, the energy distribution of the output electromagnetic radiation is determined in order to shape the reflective surface such that the distribution of output electromagnetic radiation having at least one interaction with the reflective surface overlays the distribution of output electromagnetic radiation having no interaction with the reflective surface to achieve, at the output region, a desired distribution of electromagnetic radiation.

In a more detailed feature of the invention, the output electromagnetic radiation interacting with the reflective surface is reflected at least once by the reflective surface. Further, the reflective surface may have a reentrant or a multiply reentrant shape.

In another more detailed feature of the invention, the input region is defined by an entrance aperture, the output region is associated with an exit aperture, and the reflective inner surface is an inner surface that is disposed between the entrance aperture and the exit aperture. Further, the reflective inner surface is rotationally symmetrical about a central longitudinal axis and may have a continuously varying cross-sectional radius.

In yet another more detailed feature of the invention, the step of determining is performed using a predetermined target area located in the output region and spaced away from the exit aperture, and the step of shaping the reflective surface achieves, across the target area, an arms irradiance deviation between 1% and 20%.

An alternative embodiment of the present invention is a reflective apparatus for receiving incident electromagnetic radiation from a radiation source providing a nonuniform irradiance distribution and redistributing the radiation onto a predetermined target area. The reflective apparatus has an entrance aperture configured to receive the incident radiation from the radiation source, an exit aperture configured to transmit radiation toward the target area, and a reflective inner surface disposed between the entrance aperture and the exit aperture and configured to increase the uniformity of the irradiance distribution in the target area.

In a more detailed feature of the present invention, the inner reflective surface is rotationally symmetrical about a central longitudinal axis and has a continuously varying cross-sectional radius. A substantial portion of the incident radiation received through the entrance aperture is transmitted through the exit aperture toward the target area such that, when compared with the arms irradiance deviation of the incident electromagnetic radiation, the rms irradiance deviation across the target area for any radiation received in the target area from the exit aperture is improved. More specifically, the rms irradiance distribution is improved by more than 10%.

In another more detailed feature of the invention, the entrance aperture has a radius that is greater than the radius of the exit aperture and at least a portion of the reflective inner surface has a radius that is greater than the radius of the entrance aperture. Additionally, a portion of the reflective inner surface may have a radius that is less than the radius of the exit aperture. Also, another feature is that the reflective inner surface can cause a portion of the radiation received by the entrance aperture to incur multiple reflections.

In yet another detailed feature of the invention, the reflective inner surface adjacent the entrance aperture has an increasing cross-sectional radius, in a direction along the axis from the entrance aperture to the exit aperture, providing that the entrance aperture with a flared opening. Also, the reflective inner surface adjacent the entrance aperture has an increasing cross-sectional radius, in a direction along the axis from the exit aperture to the entrance aperture, providing the entrance aperture with a flared opening. In operation, the irradiance redistribution guide, configured in accordance with the present invention, could be used with a target that is rotated about a longitudinal axis.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
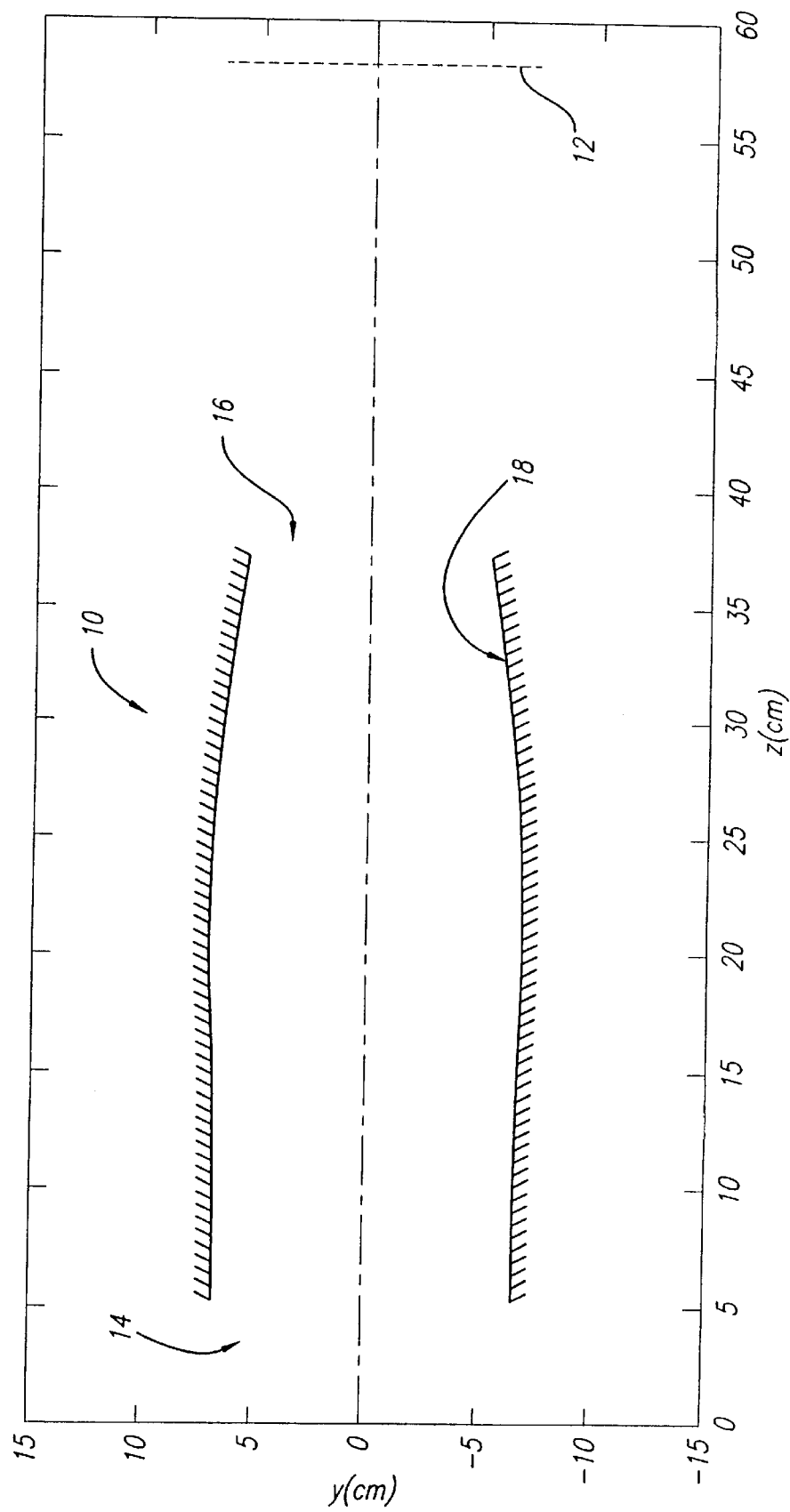
FIG. 1 is a cross-sectional view of a first embodiment of an irradiance redistribution guide, in accordance with the present invention, including a tubular inner reflective surface for uniformly redistributing the electromagnetic radiate from a concentrated radiation source onto a target area in a target plane.

As shown in the exemplary drawings, and in particular in FIG. 1, the present invention is embodied in an irradiance redistribution guide (IRG) 10 for use in providing a relatively uniform distribution of electromagnetic radiation over a predetermined target area 12 spaced away from the IRG. The IRG, when used in conjunction with a solar concentrator or the like, is advantageous in materials processing that requires a high irradiance level uniformly distributed over an extended area. The IRG is also advantageous in semiconductor processing and similar applications that require a tailored irradiance distribution.

The redistribution guide 10 has a hollow tubular shape and includes an entrance aperture 14, an exit aperture 16, and a reflective inner surface 18. The reflective inner surface has a continuously varying radius, with an optimized shape that maximizes the uniformity of the irradiation in the target area. The inner surface has a reentrant shape in that at least a portion 20 of the surface has a cross-sectional radius that is larger than the cross-sectional radius of either the entrance aperture or the exit aperture.

Figure 15A:
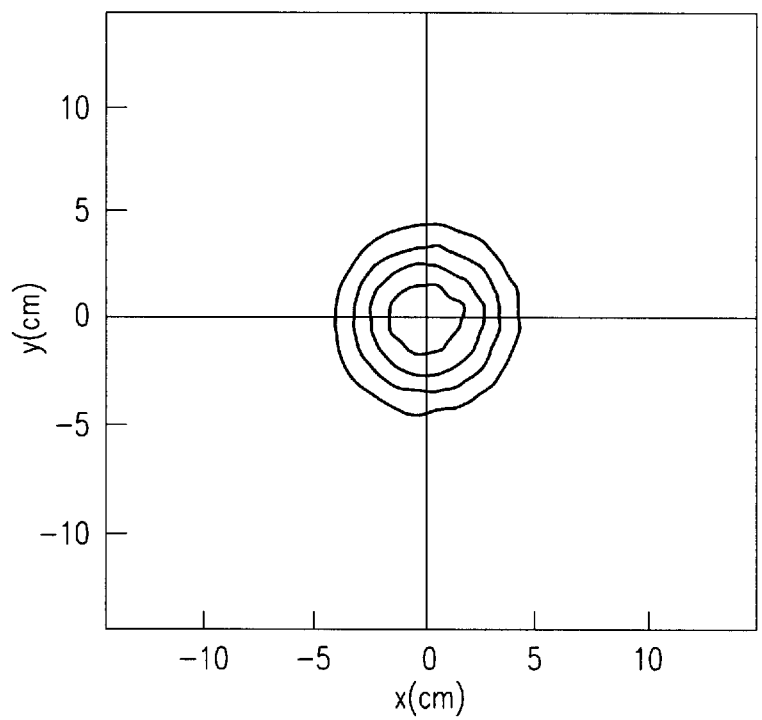
FIG. 15A is a contour plot of the irradiance distribution in the focal plane of a solar concentrator source.
Figure 15B:
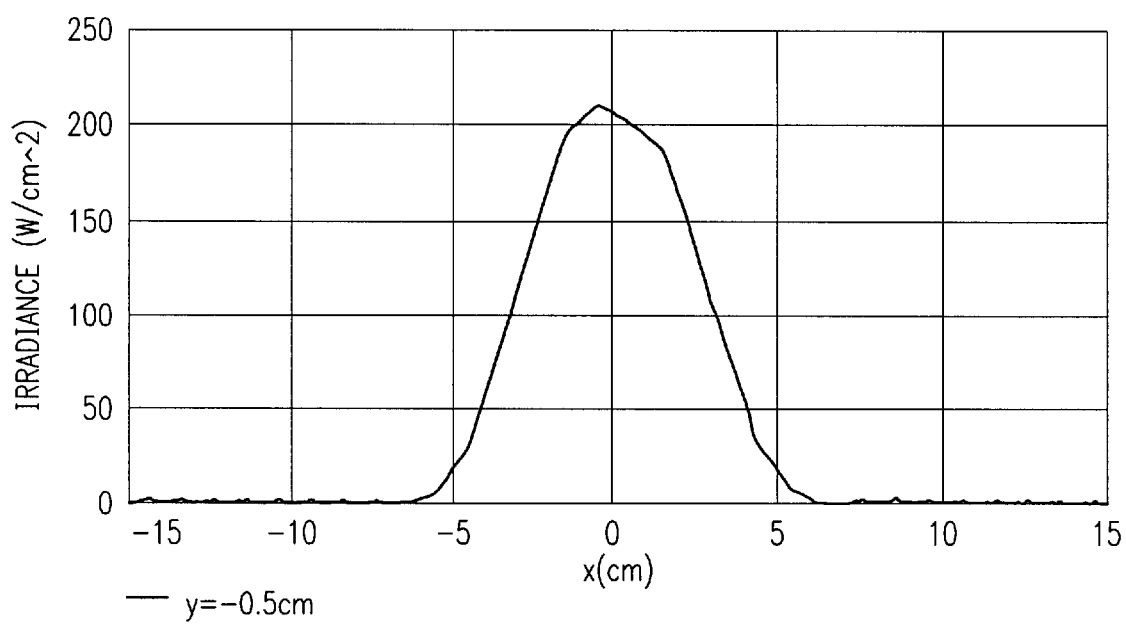
FIG. 15B is a graph of the irradiance distribution of the solar concentrator source, taken along an x-axis that extends horizontally through the center of the contour plot of FIG. 15A.
Figure 16A:
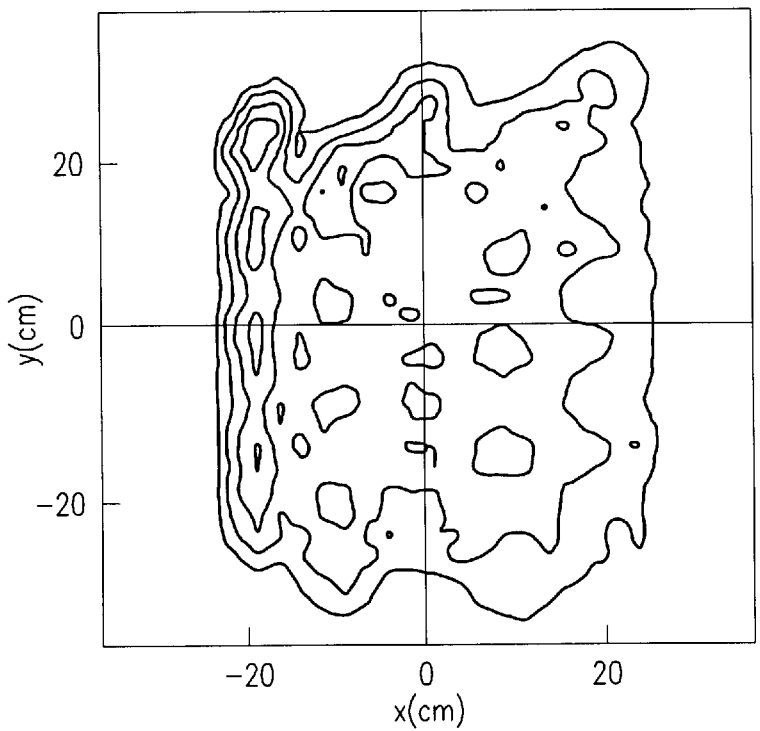
FIG. 16A is a contour plot of the irradiance distribution in a plane located 1 meter in front of the focal plane of the solar concentrator source of FIG. 15A.
Figure 16B:
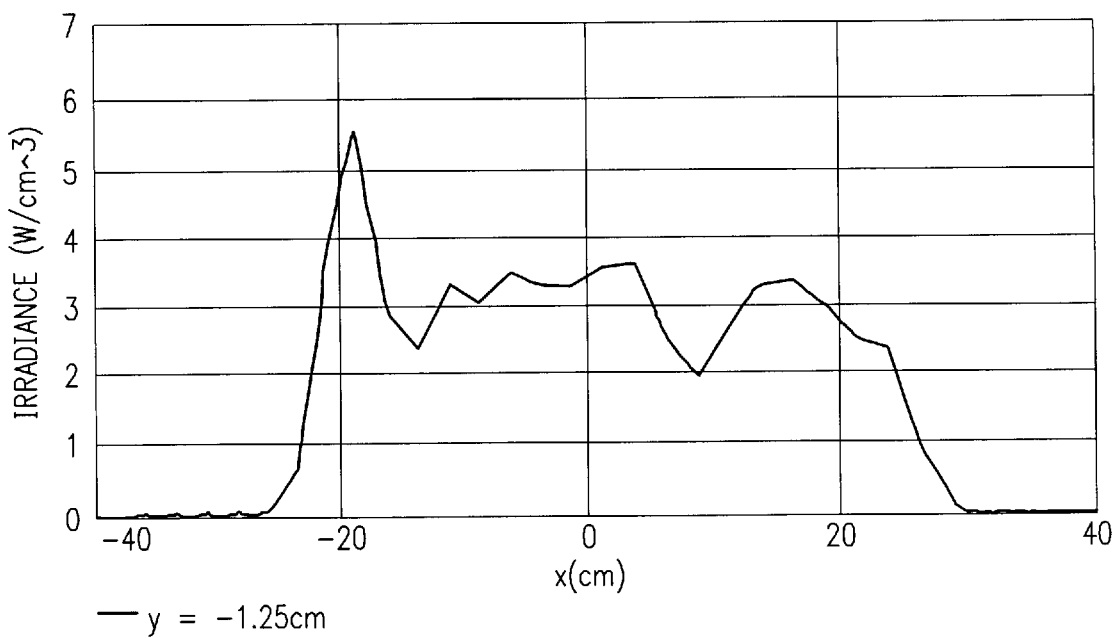
FIG. 16B a graph of the irradiance distribution of the solar concentrator source, taken along an x-axis that extends horizontally through the center of the contour plot of FIG. 16A.

A representative application for the irradiance redistribution guide 10 is the heat bonding of a metal foil to a ceramic surface having an area measuring 10 cm by 10 cm. Because the heat bonding process might result in material spattering or ablation, a finite working distance between the exit aperture and the target area 12 is desirable. To successfully implement the heat-bonding process, the irradiance distribution over the bonding area must be highly uniform. Unfortunately, as discussed above, a high-power solar concentrator produces a focal spot centered about a point in the concentrator's focal plane. The focal spot approximates a Gaussian irradiance distribution having most of its irradiance concentrated within a few centimeters, as shown in FIGS. 15A and 15B. Defocusing the concentrated beam distributes the electromagnetic radiation over a larger area, but results in a nonuniform irradiance distribution that is generally unsatisfactory for processing the extended surface area required for the heat bonding process, as shown in FIGS. 16A and 16B.

In describing the IRG 10 and its performance, a right-handed Cartesian coordinate system having x, y and z coordinates is oriented such that the x-, y-plane coincides with the concentrator's focal plane and the z-axis passes through the centroid of the focal plane irradiance distribution. Further, the irradiance distribution from the concentrator may be modeled by a ray data set containing direction cosines for rays in a plane located between the concentrator and its focal plane. Each ray is assigned an equal power weight and the x, y, z-coordinate system is oriented such that the focal spot lies at the position (0, 0, 0), the mean values of the x-and y-direction cosines for the ray data set are both zero, and the z-direction cosine for each ray is positive. Alternatively, other mathematical approaches concerning energy transport operations, such as for example, radiosity, may be employed to characterize the irradiance distribution from the concentrator.

Figure 2A:
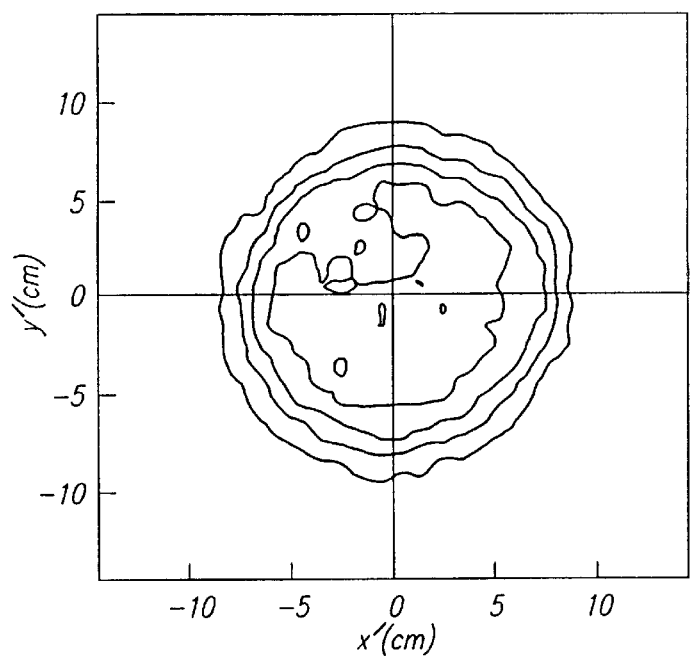
FIG. 2A is a contour plot of the irradiance distribution, across the target area, produced by the irradiance redistribution guide of FIG. 1.
Figure 2B:
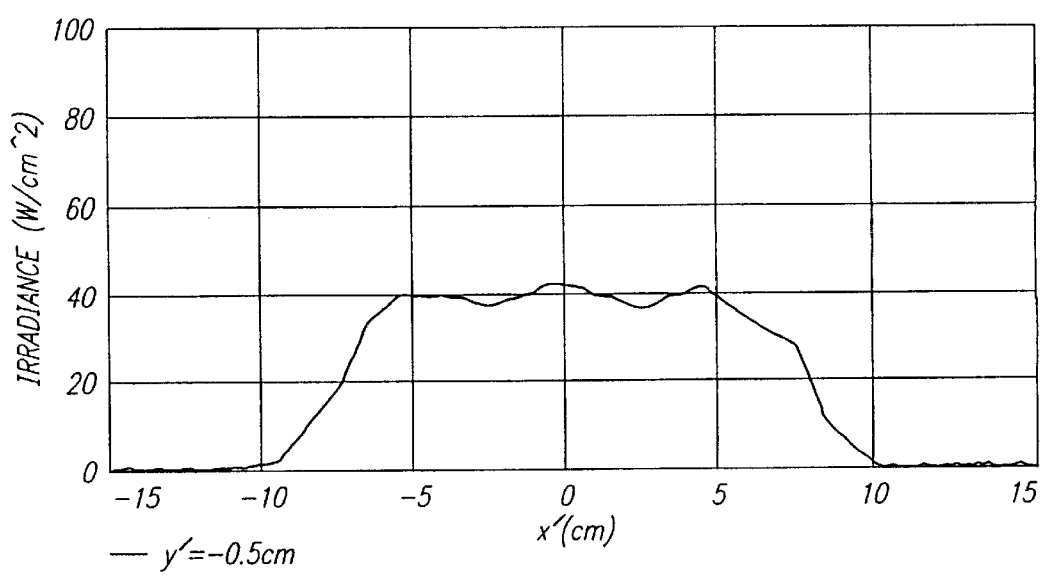
FIG. 2B is a graph of the irradiance distribution produced by the irradiance redistribution guide of FIG. 1, taken along an x-axis that extends horizontally through the center of the contour plot of FIG. 2A.

With reference now to FIGS. 2A–2B, the IRG 10, when used in conjunction with a solar concentrator, discussed above, provides a relatively uniform irradiance distribution. The performance of the IRG is summarized in Table I below.

TABLE I

Performance Summary for IRG Design

| Performance Measure | Symbol | Units | Value |
|---|---|---|---|
| Percentage rms irradiance deviation | $OF_1$ | % | 7.17 |
| Mean irradiance level over target | $E1_{ave}$ | W/cm$^2$ | 38.2 |
| Power absorbed by IRG | $P_{abs}$ | W | 488.2 |
| Percentage of 0-reflection rays | $BP_0$ | % | 28.00 |
| Percentage of 1-reflection rays | $BP_1$ | % | 70.76 |
| Percentage of 2-reflection rays | $BP_2$ | % | 1.21 |
| Percentage of 3-reflection rays | $BP_3$ | % | 0.02 |
| Percentage of 4-reflection rays | $BP_4$ | % | 0.00 |

Figure 3A:
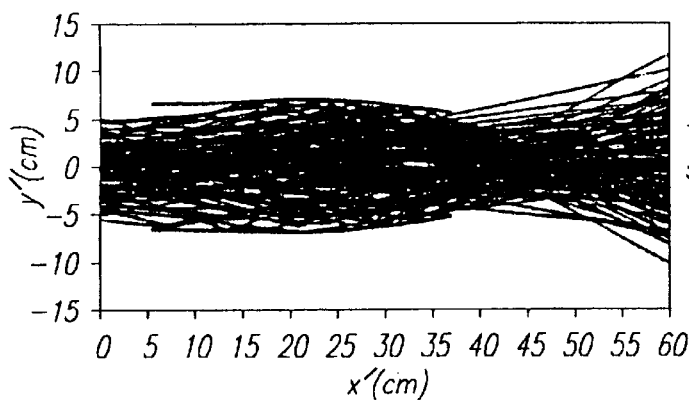
FIG. 3A is a ray trace, projected onto a y-z plane, of 200 sampled rays passing through the irradiance distribution guide of FIG. 1.
Figure 3B:
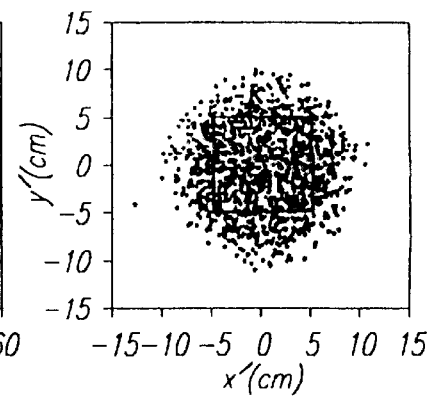
FIG. 3B is a spot diagram, in the target plane, of 1500 sampled rays produced by the irradiance redistribution guide of FIG. 1.
Figure 4A:
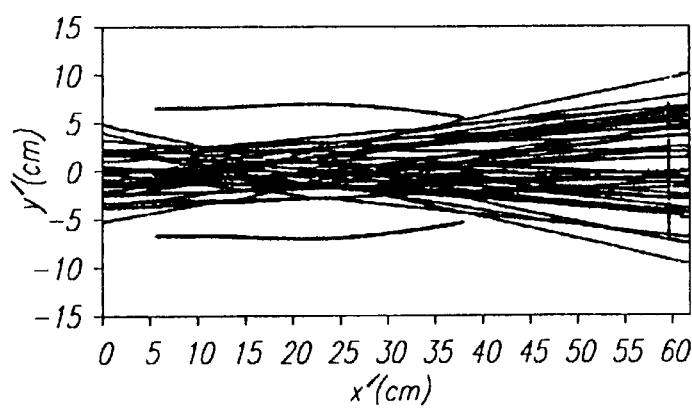
FIG. 4A is a ray trace, projected onto the y-z plane, selecting only zero-reflection rays of the 200 sampled rays of FIG. 3A.
Figure 4B:
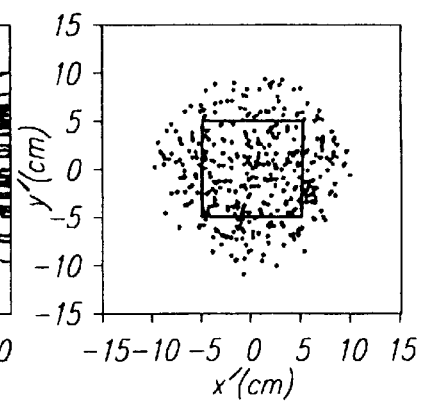
FIG. 4B is a spot diagram, in the target plane, selecting only spots associated with zero-reflection rays of the 1500 sampled rays of FIG. 3B.

The IRG's mean rms irradiance deviation is about 7.17% and the mean irradiance achieved is 38.2 w/cm$^2$. A ray trace, shown in FIG. 3A, illustrates the ray distribution within the IRG 10. It is apparent from FIG. 5A that all portions of the reflective inner surface contribute to the target-plane irradiance distribution. A target-plane spot diagram, shown in FIG. 3B, illustrates the ray distribution in relation to the 10 cm×10 cm target area 12.

As shown in FIGS. 4A–5B, and summarized in Table II below, virtually all the electromagnetic radiation incident within the target area 12 is provided by zero-reflection and one-reflection rays. This phenomenon is also shown in Table I above. The irradiance distribution guide of FIG. 1 achieves a balance between the various energy-transfer mechanisms. More specifically, the zero-reflection rays (FIGS. 4A and 4B) comprise 28.00% of the total rays and have an rms irradiance deviation of 15.26%. However, the one-reflection rays (FIGS. 5A and 5B) comprise 70.76% of the total rays and, when superimposed over the zero-reflection rays, result in an rms irradiance deviation of 7.22%. Thus it can be seen that the zero-reflection rays provide relatively low irradiance with poor uniformity. Adding in the one-reflection rays produces a large increase in the mean irradiance level and also compensates for the nonuniformity of the zero-reflection rays. The two-reflection rays increase the mean irradiance level by about 1.5%, while providing a negligible effect on the irradiance uniformity.

TABLE II

Cumulative n-Reflection Irradiance Statistics for IRG Design

| Maximum number of reflections, n | Mean irradiance, $E1_{ave}$ (W/cm$^2$) | RMS irradiance deviation, $OF_1(\%)$ |
|---|---|---|
| 0 | 9.85 | 15.26 |
| 1 | 37.66 | 7.22 |
| 2 | 38.22 | 7.19 |
| ∞ | 38.22 | 7.17 |

Figure 5A:
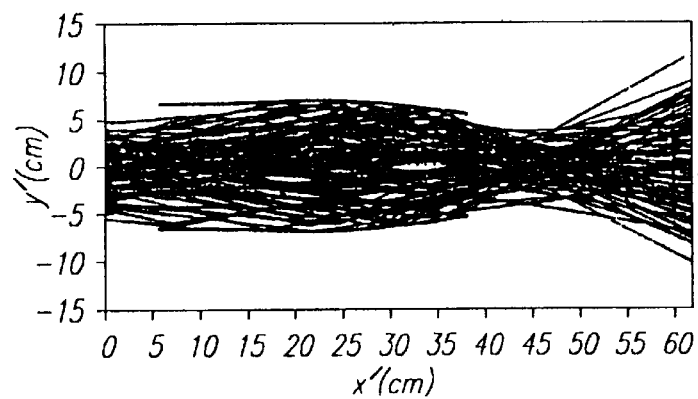
FIG. 5A is a ray trace, projected onto the y-z plane, selecting only one-reflection rays of the 200 sampled rays of FIG. 3A.
Figure 5B:
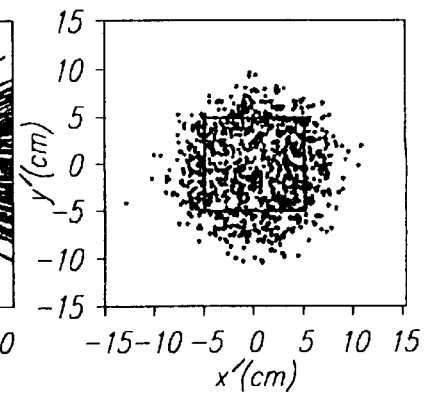
FIG. 5B is a spot diagram, in the target plane, selecting only spots sociated with one—reflections rays of the 1500 sampled rays of FIG. 3B.

FIG. 5A shows that the IRG 10 acts as an energy relay that converges the one-reflection rays to a hot spot between the IRG's exit aperture 16 and the target plane. The rays, after the hot spot, then diverge to cover the target area 12. This energy relay mechanism allows the target plane to be located a significant distance from the IRG's exit aperture which, as discussed above, is advantageous for certain processing applications.

Figure 6:
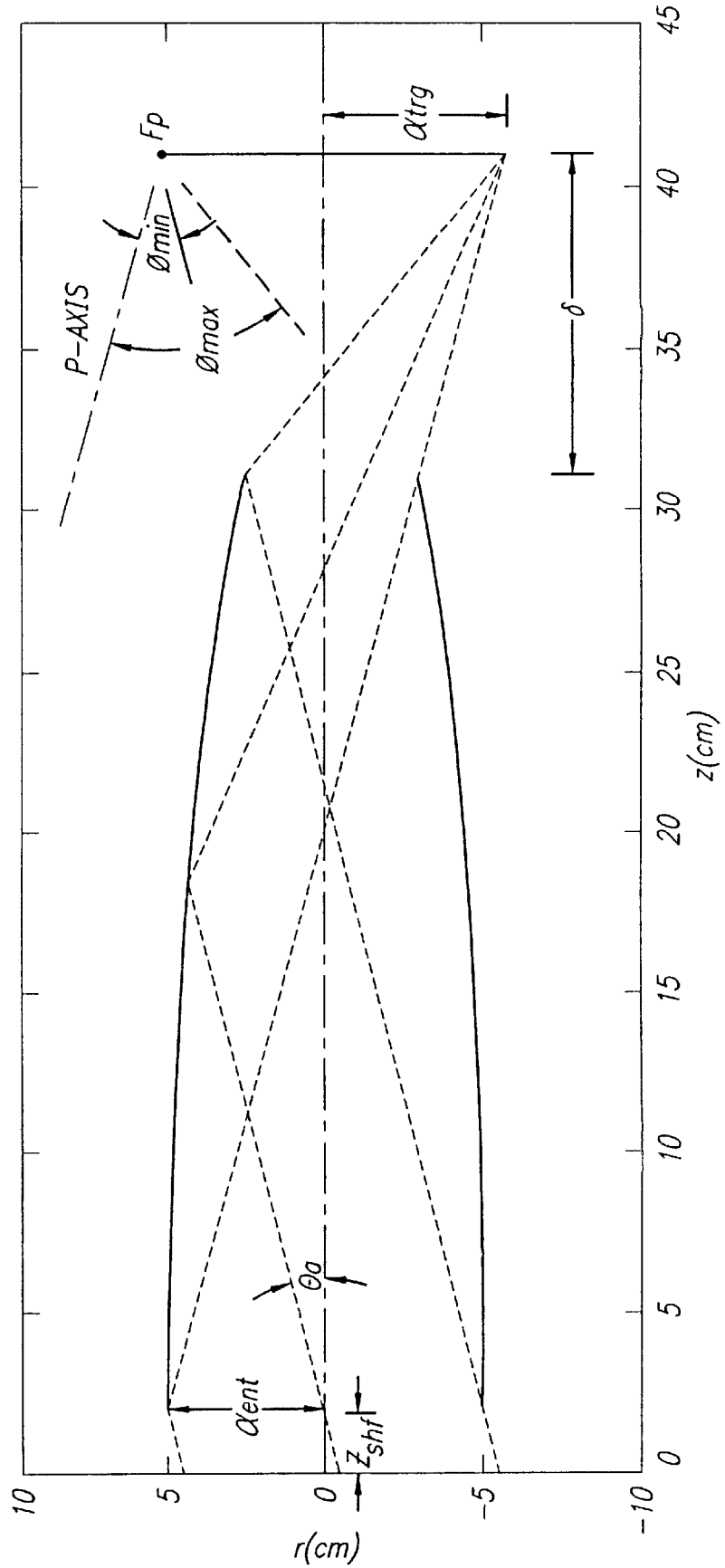
FIG. 6 is a cross-sectional view of a finite-working-distance compound parabolic concentrator.

The shape of the IRG 10 was initially derived as a deviation from the shape of a finite-working-distance compound parabolic concentrator (FCPC) shown in FIG. 6, which serves as a base shape. The shape of the FCPC will be discussed in more detail below. Discussion of the derivation of the IRG's shape from the FCPC's base shape can be found in J. Bortz, N. Shatz and A. Lewandowski, "optimal Design of Irradiance Redistribution Guides for the National Renewable Energy Laboratory's High-Flux Solar Furnace," Nonimaging Optics: Maximum Efficiency Light Transfer III, Proceedings SPIE 2538, (1995). A more general discussion of non-imaging electromagnetic projection systems using multiple reflections can be found in U.S. Pat. No. 5,237,170 to N. Shatz titled, "Method and Apparatus for Non-Imaging Concentration and Projection of Electromagnetic Radiation."

With reference to Table III below, the shape of the reflective inner surface 18 of the IRG 10 is a natural spline function uniquely determined by five knots spaced at equal distances between the entrance aperture 14 and the exit aperture 16. The knots are expressed as deviations from the surface of the FCPC. The entrance aperture has a cross-sectional radius of 6.590 cm and is spaced 5.298 cm behind the focal plane of the solar concentrator. Thus, the irradiance distribution is generally expanding as it enters the IRG. The IRG provides a working distance of over 20 cm.

TABLE III

Shape Definition Parameters for IRG Design

| Parameter Description | Parameter Symbol | Units | Value |
|---|---|---|---|
| Entrance-aperture radius | a'$_{ent}$ | cm | 6.590 |
| Exit-aperture radius | a'$_{exit}$ | cm | 5.415 |
| Length | L$_0$ | cm | 31.897 |
| Entrance-aperture position | Z$_{shft}$ | cm | 5.298 |
| Radial deviation (knot #1) | rk$_1$ | mm | 2.296 |
| Radial deviation (knot #2) | rk$_2$ | mm | 4.343 |
| Radial deviation (knot #3) | rk$_3$ | mm | 10.113 |
| Radial deviation (knot #4) | rk$_4$ | mm | 11.691 |
| Radial deviation (knot #5) | rk$_5$ | mm | 11.137 |
| FCPC entrance-aperture radius | a$_{ent}$ | cm | 6.361 |
| FCPC acceptance angle | θ$_a$ | deg | 18.482 |
| FCPC working distance | δ | cm | 20.965 |

Because the knots are listed as deviations from the FCPC, the shape of the FCPC (FIG. 6) is now reviewed. The FCPC shape is given by the following formulas, derived by application of the edge-ray principle:

$$z(\phi) = z_{shft} + L_{tot} - 2 \cdot p \cdot \frac{\cos(\phi - \theta_a)}{1 - \cos(\phi)}$$

and, $$r(\phi) = 2 \cdot p \cdot \frac{\sin(\phi - \theta_a)}{1 - \cos(\phi)} - a_{trg}$$

where z (φ) is the coordinate along the optical axis, r (φ) is the radial coordinate (orthogonal to the z-axis), φ is the angular parameter varied to generate the shape (see below), $z_{shft}$ is the position shift of the FCPC's entrance pupil along the z-axis, $L_{tot}$ is the total distance from the entrance pupil to the target plane (see below), p is the focal length of the parabolic cross section of the FCPC shape (see below), $θ_a$ is the desired acceptance angle of the FCPC, and $a_{trg}$ is the radius of the illuminated target circle (see below) The formula for the focal length of the FCPC is:

$$p = \frac{(2a_{ent} + \delta \cdot \tan(\theta_a)) \cdot \sin(\theta_a) + \sqrt{[(2a_{ent} + \delta\tan(\theta_a)) \cdot \sin(\theta_a)]^2 - (a_{ent} \cdot \sin(2\theta_a))^2}}{2}$$

where $a_{ent}$ is the desired entrance pupil radius and δ is the desired working distance between the exit pupil and the target plane. The radius of the illuminated circular region in the target plane is:

$$a_{trg} = \frac{p}{\sin(\theta_a)} - a_{ent}$$

The distance from the FCIC's entrance pupil to the target plane is:

$$L_{tot} = \frac{a_{ent} + a_{trg}}{\tan(\theta_a)}$$

The minimum and maximum values of the angular parameter φ are:

$$\phi_{min} = 2\theta_a,$$

and $$\phi_{max} = a\cos\left|\frac{\frac{\delta}{\cos(\theta_a)} - 2a_{trg}\sin(\theta_a)}{\sqrt{\left(\frac{\delta}{\cos(\theta_a)}\right)^2 + (2a_{trg})^2 - 4\delta a_{trg}\tan(\theta_a)}}\right|$$

Note that the FCPC's shape is defined by three parameters: the desired acceptance angle $\phi_a$, the entrance-aperture radius $a_{ent}$, and the working distance δ. It is of the above formulas for the FCPC shape reduce to the shape formulas for a conventional CPC.

As mentioned previously, the FCFC serves as a base shape to whch cubic-spline deviations are added to produce the final IRG shape model. A brief discussion of the method used for generating these deviations is now described. The target area is divided into 100 square bins, each of 1 cm×1 cm size. the z-axis, over the length of the FCPC. The z-coordinates of these spline knots are:

$$zk_i = z_{shft} + \frac{i-1}{N_{spln} - 1} L_0 \quad (\text{for } i = 1, \ldots, N_{spln})$$

where $N_{spin}$ is the number of spline knots and $L_0$ is the length of the optical component along the z-axis:

$$L_0 = L_{tot} - \delta.$$

For defining the IRG's shape, the number of deviation knots selected is $N_{spin}=5$. The radial knot coordinates $rk_i$ (for i =1, . . . , $N_{spin}$) were allowed to vary within preset ranges during an optimization procedure. Based on the axial and radial knot coordinates, a cubic-spline deviation function $r_{prt}(z)$ is defined over the entire length of the base shape. A natural cubic-spline curve is used, meaning that the second derivative of the spline function is set equal to zero at both endpoints. At any axial coordinate z, the spline function $r_{prt}(z)$ represents the is radial-coordinate deviation to be added to the FCPC base shape, to generate the IRG shape. Therefore the radial coordinate $r_{IRG}(\phi)$ of the IRG shape can be obtained by substituting z(φ) for z in the spline deviation function $r_{prt}(z)$, and by then adding the result to the radial coordinate r(φ) of the FCPC base shape:

$$r_{IRG}(\phi) = r(\phi) + r_{prt}(z(\phi)).$$

The axial coordinate $z_{IRG}$ (φ) of the IRG shape is identical to the axial coordinate of the underlaying FCPC:

$$z_{IRG}(\phi) = z(\phi)$$

To model the IRG's performance, the equations for $r_{IRG}$ are used to generate a total of 51 points on the profile of the IRG, with uniform sampling of the angular parameter φ between its minimum uniform sampling of the angular parameter φ between its minimum and maximum values. These 51 points on the IRG profile, along with the calculated slopes at both endpoints, are used to define a parametric-cubic-spline shape representation of the IRG.

The five deviation knots are equally spaced along the IRG's length, with knot #1 placed at the entrance aperture and knot #5 at the exit aperture. Thus, the distance between the knots is 7.974 cm, based on a total $L_0$ length of 31.897 cm.

In relation to the z-axis, the shape of the IRG is uniquely determined by the knot positions in the following table:

TABLE IV

Knot Positions for IRG Design

| Knot No. | z(cm) | $z_{IRG}$(cm) | $r_{IRG}$(cm) |
|---|---|---|---|
| 1 | 5.298 | 0 | 6.590 |
| 2 | 13.272 | 7.974 | 6.698 |
| 3 | 21.247 | 15.949 | 6.951 |
| 4 | 29.221 | 23.923 | 6.491 |
| 5 | 37.195 | 31.897 | 5.415 |

The IRG has a reentrant optical shape, with a maximum cross-sectional radius approaching 6.951 cm. Thus, the IRG uses a complex energy relay mechanism to achieve a relatively high irradiance uniformity over the target area, while providing a large working distance and a high mean irradiance. As a result, the IRG's reflective inner surface causes the energy density of the radiation propagating through the apparatus to undergo alternating concentrations and dilutions along the IRG's longitudinal axis.

Figure 7:
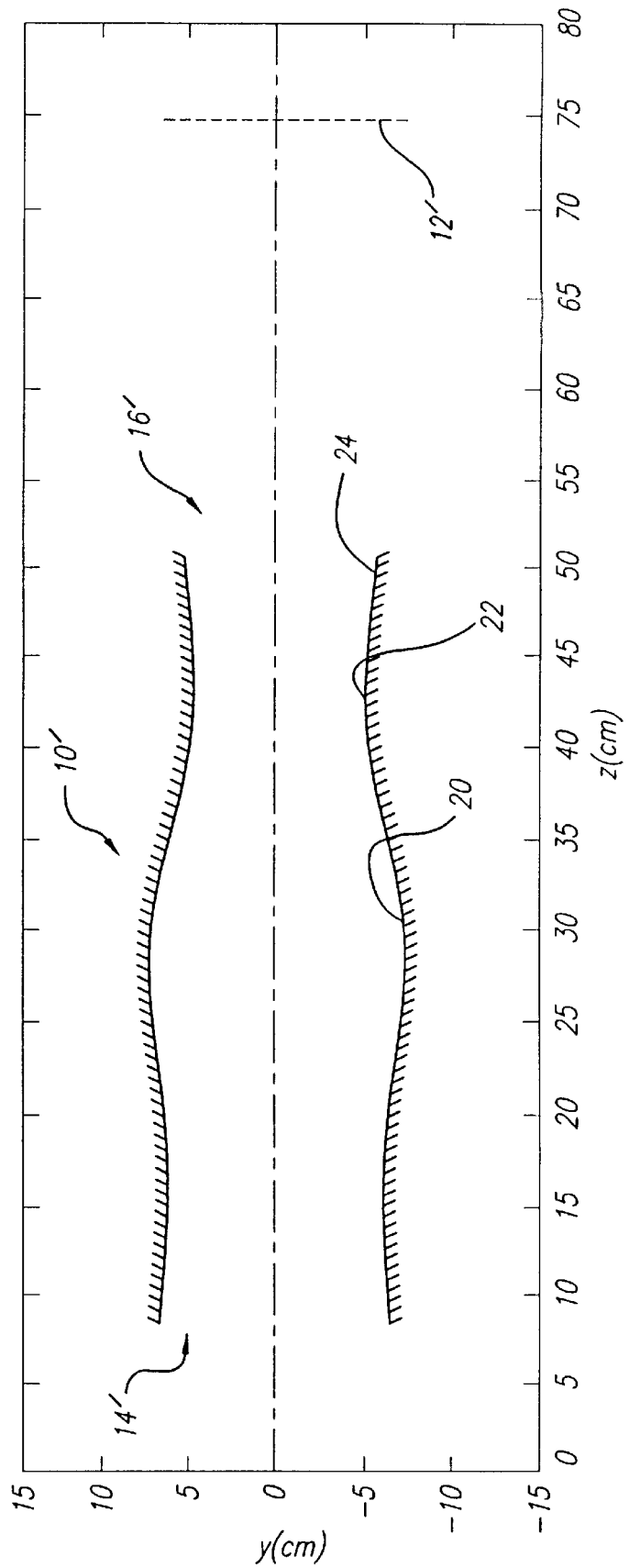
FIG. 7 is a cross-sectional view of a second embodiment of an irradiance redistribution guide, in accordance with the present invention, including a tubular inner reflective surface for uniformly redistributing the electromagnetic radiation from a concentrated radiation source onto a rotating target area in a target plane.

A second embodiment of an irradiance distribution guide (IRR) of the present invention, is shown in FIG. 7. The IRG-R has a reflective inner surface with a shape that requires at least a portion of received by the entrance aperture to incur at least two reflections and that also causes the energy density of the radiation propagating through the apparatus to undergo alternating concentrations and dilutions along its longitudinal axis. The IRG-R is optimized for use with a target, in a target area 12', that continuously rotates about the z-axis. The target area rotation provides a smoothing effect that enhances the uniformty of the irradiance distribution over time. To account for the smoothing effect associated with the rotation, the target area is divided into annular, or ring-shaped, power collection bins to cover the area of the square 10 cm×10 cm target.

Figure 8B:
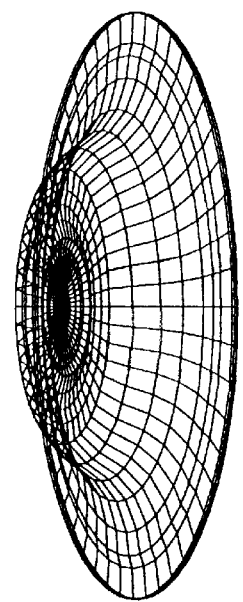
FIG. 8B is a three-dimensional graph of the irradiance distribution across the target area, produced by the irradiance redistribution guide of FIG. 7.
Figure 8A:
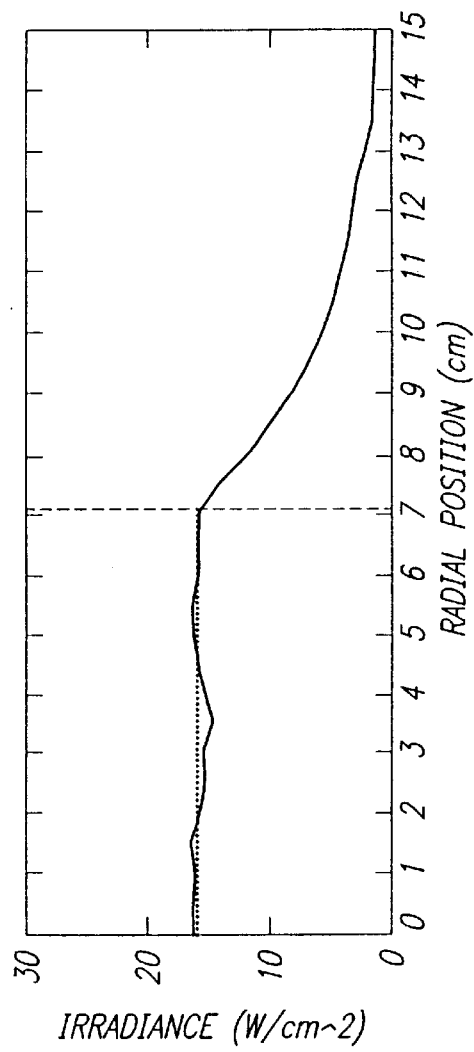
FIG. 8A a graph of the irradiance distribution, across the target area, produced by the irradiance redistribution guide of FIG. 7.
Figure 9A:
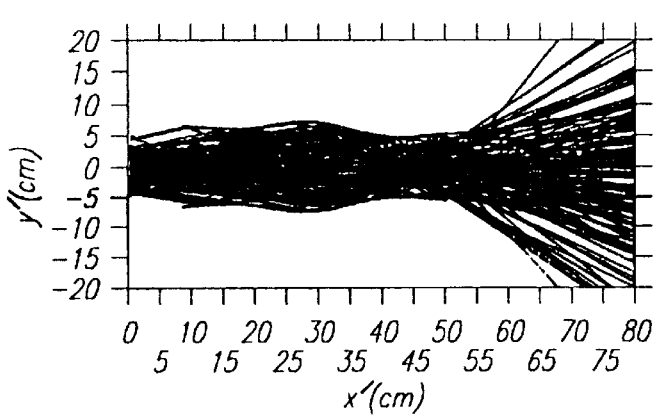
FIG. 9A is a ray trace, projected onto the y-z plane, of 200 sampled rays passing through the irradiance redistribution guide of FIG. 7.
Figure 9B:
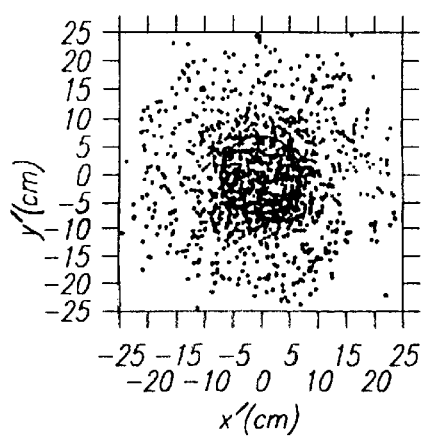
FIG. 9B is a spot diagram, in the target plane, of 1500 sampled rays produced by the irradiance redistribution guide of FIG. 7.
Figure 10A:
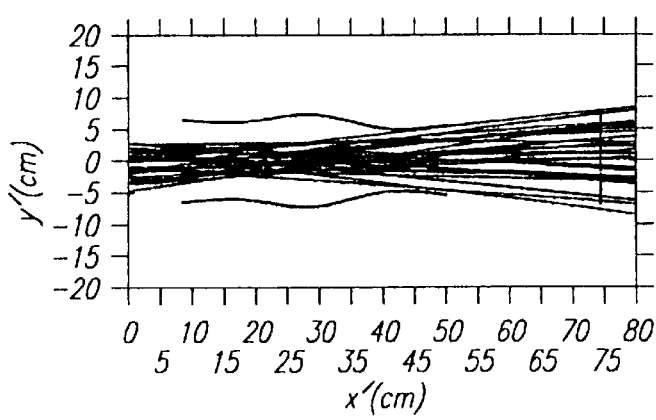
FIG. 10A is a ray trace projected onto the y-z plane, selecting only zero-reflection rays of the 200 sampled rays of FIG. 9A.
Figure 10B:
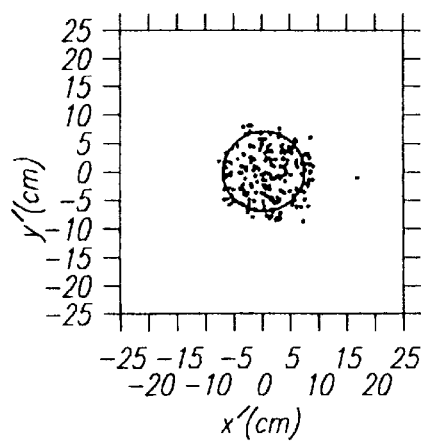
FIG. 10B is a spot diagram, in the target plane, selecting only spots associated with zero-reflection rays of the 1500 sampled rays of FIG. 9B.
Figure 11A:
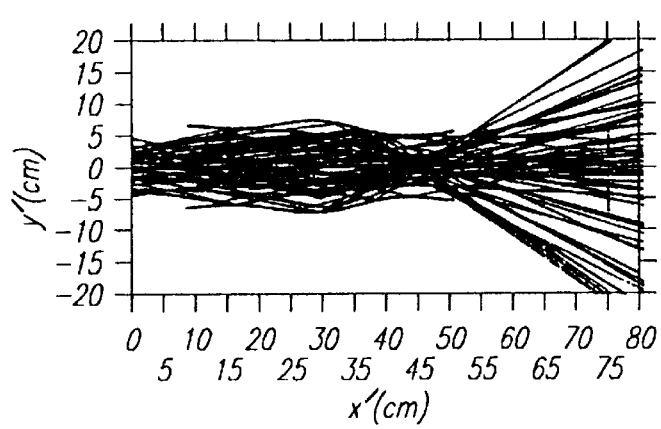
FIG. 11A is a ray trace, projected onto the y-z plane, selecting only one-reflection rays of the 200 sampled rays of FIG. 9A.
Figure 11B:
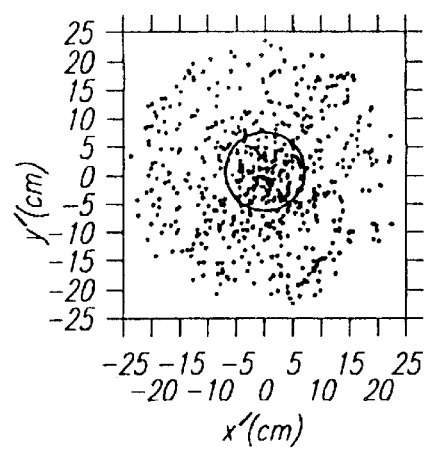
FIG. 11B is a spot diagram, in the target plane, selecting only spots associated with one-reflection rays of the 1500 sampled rays of FIG. 9B.

The target-plane irradiance distribution produced by the IRG-R is shown in FIGS. 8A and 8B and summarized in Tables V and VI below:

TABLE V

Performance Summary for IRG-R Design

| Performance Measure | Symbol | Units | Value |
|---|---|---|---|
| Percentage RMS irradiance deviation | $OF_2$ | % | 3.14 |
| Mean irradiance level over target | $E2_{ave}$ | W/cm² | 15.8 |
| Power absorbed by IRG | $P_{abs}$ | W | 861.2 |
| Percentage of 0-reflection rays | $BP_0$ | % | 17.64 |
| Percentage of 1-reflection rays | $BP_1$ | % | 39.48 |
| Percentage of 2-reflection rays | $BP_2$ | % | 36.15 |
| Percentage of 3-reflection rays | $BP_3$ | % | 5.08 |
| Percentage of 4-reflection rays | $BP_4$ | % | 1.49 |
| Percentage of 5-reflection rays | $BP_5$ | % | 0.06 |

TABLE VI

Cumulative n-reflection irradiance statistics for IRG-R

| Maximum Number of Reflections, n | Mean Irradiance, $E2_{ave}$ (W/cm²) | RMS Irradiance Deviation, $OF_2$ |
|---|---|---|
| 0 | 5.61 | 8.26 |
| 1 | 11.64 | 17.63 |
| 2 | 15.63 | 2.93 |
| 3 | 15.78 | 2.96 |
| ∞ | 15.83 | 3.14 |

The IRG-R achieves an RMS irradiance deviation of 3.14%, while providing a mean irradiance level of 15.83 w/cm² Tables V and VI show that higher-order, multiple reflections have a greater effect on the uniformity of the irradiance distribution. More specifically, the zero-reflection rays provide a low mean irradiance with reasonably good uniformity. The one-reflection rays greatly increase the mean irradiance, but have a deleterious effect on uniformity. The two-reflection rays further increase the mean irradiance level, but most importantly, they compensate for the non-uniformities introduced by the one-reflection rays, resulting in a highly uniform pattern.

The compensation effect can be seen more clearly with reference to FIGS. 9A–14B. FIG. 10B shows that the zero-reflection rays form an illuminated spot having a radius slightly larger than the radius of the target and an rms irradiance deviation of 8.26% (Table VI). The one-reflection rays form a hot spot, or region of concentrated irradiance, inside the IRG-R at about z'=44 cm, as shown in FIG. 11A. The energy from this hot spot diverges to form an illuminated target-plane spot having a radius of about 22 cm, as shown in FIG. 11B. Additionally, while greatly increasing the mean irradiance in the target area, the one-reflection rays actually degrade the cumulative rms irradiance deviation to about 17.65%. The two-reflection rays also greatly increase the mean irradiance in the target area. More importantly, as shown in FIG. 12B, the two-reflection rays are distributed mostly near the edge of the target area and greatly improve the cumulative rms irradiance deviation to 2.93% by compensating the nonuniformity produced by the one-reflection rays.

Figures 12A, 12B:
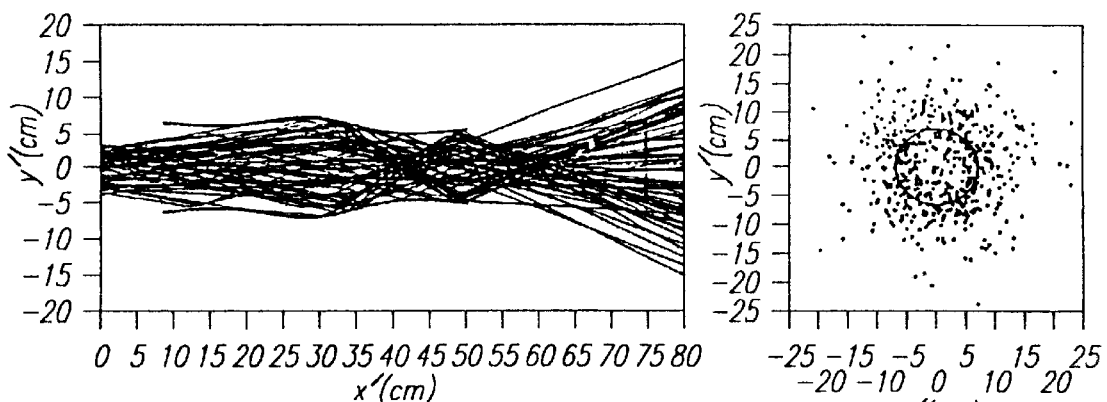
FIG. 12A is a ray trace, projected onto the y-z plane, selecting only two-reflection rays of the 200 sampled rays of FIG. 9A.
FIG. 12B is a spot diagram, in the target plane, selecting only spots associated with two-reflection rays of the 1500 sampled rays of FIG. 9B.

A peculiar feature of the IRG-R 10' is that its interior reflective surface has a mutiply-reentrant shape. The multiply-reentrant interior surface has at least a portion 20 with a cross-sectional radius greater than the radius of either the entrance aperture 14' or the exit aperture 16' and also has at least a portion 22 with a cross-sectional radius less than the radius of either the entrance aperture or the exit aperture. The multiply reentrant design results in the exit-aperture having a flared surface 24. As shown in FIG. 12A, a first hot spot of two-reflection rays forms within the IRG-R at about z'=42 cm. The flared surface reflects the two-reflection rays diverging from the first hot spot and converges these two-reflection rays toward a second hot spot at about z'=60 cm. These rays then diverge again and are distributed mostly near the target area's edge.

Figures 13A, 13B:
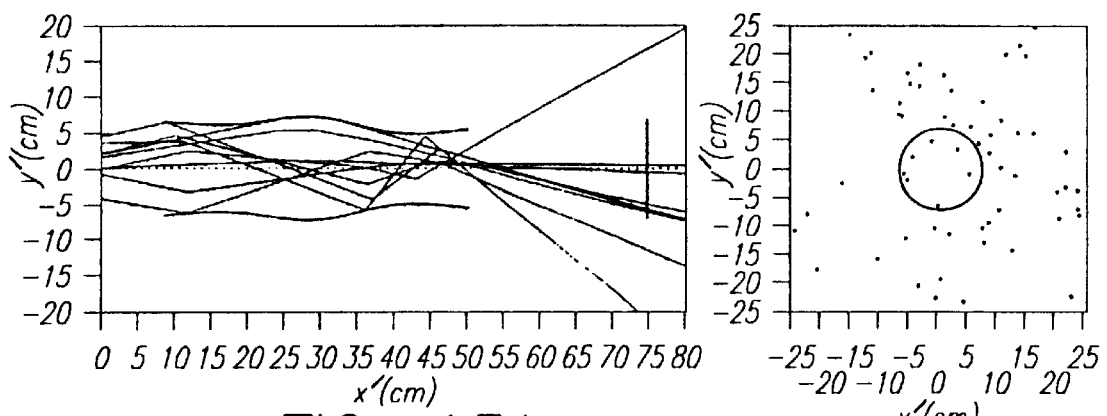
FIG. 13A is a ray trace projected onto the y-z plane, selecting only three-reflection rays of the 200 sampled rays of FIG. 9A.
FIG. 13B is a spot diagram, in the target plane, selecting only spots associated with three-reflection rays of the 1500 sampled rays of FIG. 9B.
Figures 14A, 14B:
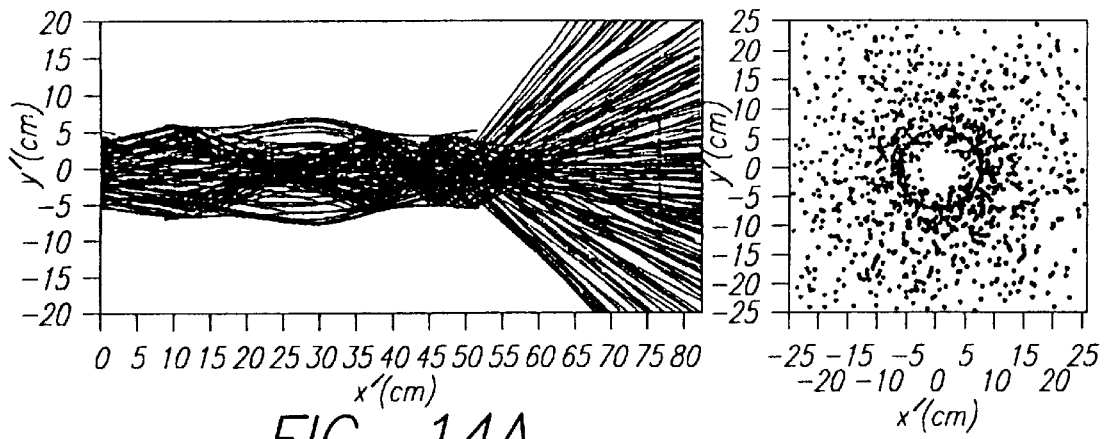
FIG. 14A is a ray trace, projected onto the y-z plane, of 200 sampled three-reflection rays passing through the irradiance distribution guide of FIG. 7.
FIG. 14B is a spot diagram, in the target plane, of 1500 sampled three-reflection rays passing through the irradiance redistribution guide of FIG. 7.

The contribution of the three-reflection rays is shown in FIGS. 13A and 13B. Studies show that the three-reflection rays are not a major factor in causing the IRG-R 10' to achieve a low cumulative rms irradiance deviation. By increasing the number of three-reflection rays, FIGS. 14A and 14B show that the three-reflection rays form three distinguishable hot spots and that these rays are almost exclusively distributed near the edges of the target area.

The IRG-R's shape, when given as an FCPC deviation, is defined by the parameters listed in Table VII below:

TABLE VII

Shape definition parameters for IRG-R design

| Parameter Description | Parameter Symbol | Units | Value |
|---|---|---|---|
| Entrance-aperture radius of IRG | $a'_{ent}$ | cm | 6.502 |
| Exit-aperture radius of IRG-R | $a'_{exit}$ | cm | 5.424 |
| Length of IRG-R | $L_0$ | cm | 42.132 |
| Entrance-aperture position | $Z_{shft}$ | cm | 8.413 |
| Radial deviation (knot #1) | $rk_1$ | mm | −11.630 |
| Radial deviation (knot #2) | $rk_2$ | mm | −13.696 |
| Radial deviation (knot #3) | $rk_3$ | mm | 0.870 |
| Radial deviation (knot #4) | $rk_4$ | mm | −13.079 |
| Radial deviation (knot #5) | $rk_5$ | mm | 4.744 |
| FCPC entrance-aperture radius | $a_{ent}$ | cm | 7.665 |
| FCPC acceptance angle | $\theta_a$ | deg | 16.668 |
| FCPC working distance | $\delta$ | cm | 24.202 |

One feature of the IRG-R 10' is that it is about 10 cm longer than the IRG 10. In relation to the z-axis, the shape of the IRG-R is uniquely determined by the knot positions set forth in

TABLE VIII

Knot Positions for IRG-R

| Knot No. | z(cm) | $z_{IRG}$(cm) | $R_{IRG-R}$(cm) |
|---|---|---|---|
| 1 | 8.413 | 0 | 6.502 |
| 2 | 18.946 | 10.533 | 6.172 |
| 3 | 29.479 | 21.066 | 7.210 |
| 4 | 40.012 | 31.599 | 5.007 |
| 5 | 50.545 | 41.600 | 5.424 |

The IRG-R 10' has a "flared" or multiply-reentrant optical shape with a maximum cross-sectional radius of about 7.250 cm and minimum cross-sectional radius of about 6.046 cm. Thus, as noted above, the IRG-R also uses a flared design and a complex energy relay mechanism to achieve high irradiance uniformity over a rotating target area, while providing a large working distance and a relatively high mean irradiance.

Although the foregoing discloses the presently preferred embodiments of the present invention, it is understood that the those skilled in the art may make various changes to the preferred embodiments shown and described without departing from the scope of the invention. The invention is defined only by the following claims.

What is claimed is:

1. Apparatus for redistributing onto a predetermined target area, incident electromagnetic radiation from a radiation source that provides a predetermined irradiance distribution, comprising:
   an entrance aperture configured to receive the incident radiation from the radiation source;
   an exit aperture configured to transmit radiation toward the target area; and
   a reflective inner surface disposed between the entrance aperture and exit aperture and configured to increase the uniformity of the irradiance distribution in the target area, wherein said exit aperture has a flared surface.

2. Apparatus as defined in claim 1, wherein the reflective inner surface causes a portion of the radiation received by the entrance aperture to incur at least two reflections.

3. Apparatus as defined in claim 1, wherein the reflective inner surface causes an energy density of a portion of the radiation propagating through the apparatus to undergo alternating concentrations and dilutions along a longitudinal axis of the apparatus.

4. Apparatus as defined in claim 1, wherein a target positioned within the predetermined target area is configured for rotation about the longitudinal axis of the apparatus.

5. An apparatus for redistributing onto a predetermined target area, incident electromagnetic radiation from a radiation source that provides a predetermined irradiance distribution, comprising:
   an entrance aperture configured to receive the incident radiation from the radiation source;
   an exit aperture configured to transmit radiation toward the target area;
   a reflective inner surface disposed between the entrance aperture and the exit aperture, the reflective inner surface being rotationally symmetrical about a central longitudinal axis and having a continuously varying cross-sectional radius wherein a portion of said incident electromagnetic radiation has a convergence between the exit aperture and the target area; and
   a substantial portion of the incident radiation received through the entrance aperture is transmitted through the exit aperture toward the target area such that, when compared with the rms irradiance deviation of the incident electromagnetic radiation, the rms irradiance deviation across the target area for any radiation received in the target area from the exit aperture is improved,
   and wherein the reflective inner surface adjacent the exit aperture has an increasing cross-sectional radius, in a direction along the axis from the entrance aperture to the exit aperture, providing the exit aperture with a flared opening.

6. An apparatus for redistributing onto a predetermined target area, incident electromagnetic radiation from a radiation source that provides a non-uniform irradiance distribution, comprising:
   an entrance aperture configured to receive the incident radiation from the radiation source;
   an exit aperture spaced away from the target area and configured to transmit radiation toward the target area; and
   a reflective inner surface disposed between the entrance aperture and the exit aperture, the reflective inner surface adjacent the exit aperture having an increasing cross-sectional radius, in a direction along a central longitudinal axis from the entrance aperture to the exit aperture, providing the exit aperture with a flared opening.

7. Apparatus for redistributing electromagnetic radiation as defined in claim 6, wherein the reflective inner surface adjacent the entrance aperture has an increasing cross-sectional radius, in a direction along the axis from the exit aperture to the entrance aperture, providing the entrance aperture with a flared opening.

8. Apparatus for redistributing electromagnetic radiation as defined in claim 6, wherein the rms irradiance deviation across the target area is less than 10%.

9. Apparatus for redistributing electromagnetic radiation as defined in claim 6, wherein the rms irradiance deviation across the target area is less than 3.5%.

10. Apparatus for, redistributing electromagnetic radiation as defined in claim 6, wherein the entrance aperture has a radius that is greater that the radius of the exit aperture and at least a portion of the reflective inner surface has a radius that is greater than the radius of the entrance aperture.

\* \* \* \* \*